(12) United States Patent
Bordenave (10) Patent No.: US 10,704,580 B2
(45) Date of Patent: Jul. 7, 2020

(54) APPARATUS FOR ATTACHING A WALKER TO A WHEELCHAIR

(71) Applicant: Daniel Bordenave, Niagara Falls (CA)

(72) Inventor: Daniel Bordenave, Niagara Falls (CA)

( * ) Notice: Subject to any disclaimer, the term of this patent is extended or adjusted under 35 U.S.C. 154(b) by 173 days.

(21) Appl. No.: 15/414,012

(22) Filed: Jan. 24, 2017

(65) Prior Publication Data

US 2018/0209459 A1 Jul. 26, 2018

(51) Int. Cl.
| | | |
|---|---|---|
| *F16B 7/10* | (2006.01) | |
| *A61G 5/10* | (2006.01) | |
| *A61G 5/14* | (2006.01) | |
| *A61H 3/04* | (2006.01) | |
| *A61G 7/10* | (2006.01) | |
| *F16B 7/14* | (2006.01) | |

(52) U.S. Cl.
CPC ............... *F16B 7/10* (2013.01); *A61G 5/10* (2013.01); *A61G 5/14* (2013.01); *A61G 7/1038* (2013.01); *A61H 3/04* (2013.01); *A61H 2003/046* (2013.01); *A61H 2201/0149* (2013.01); *A61H 2201/0161* (2013.01); *A61H 2201/0192* (2013.01); *F16B 7/14* (2013.01)

(58) Field of Classification Search
CPC ..... F16B 7/10; F16B 7/14; A61G 5/10; A61G 5/14; A61G 7/1038; A61G 3/04; A61G 2003/046; A61G 2201/0149; A61G 2201/0161; A61G 2201/0192
See application file for complete search history.

(56) References Cited

U.S. PATENT DOCUMENTS

| | | | | | |
|---|---|---|---|---|---|
| 2,556,121 | A | * | 6/1951 | Thomas | A61G 5/10 280/304.1 |
| 2,596,055 | A | * | 5/1952 | Thomas | A61G 5/14 280/304.1 |
| 3,999,778 | A | * | 12/1976 | Markiel | A61G 5/14 280/304.1 |
| 4,465,262 | A | * | 8/1984 | Itri | E01F 13/02 160/374 |
| 5,419,571 | A | * | 5/1995 | Vaughan | A61G 5/10 280/250.1 |
| 5,564,786 | A | * | 10/1996 | Peek | A61G 5/10 280/250.1 |
| 5,984,418 | A | * | 11/1999 | McInturff | A61G 5/1062 248/298.1 |
| 6,467,797 | B1 | * | 10/2002 | Lofy | A61G 5/10 280/647 |
| 6,702,313 | B2 | * | 3/2004 | Forshee | A61G 5/10 280/304.1 |
| 9,351,901 | B1 | * | 5/2016 | Petsch | A63B 22/001 |
| 10,052,254 | B2 | * | 8/2018 | Chen | A61G 5/10 |
| 2002/0084617 | A1 | * | 7/2002 | Torsiello | A61G 5/10 280/250.1 |
| 2014/0300071 | A1 | | 10/2014 | Purdue | |
| 2016/0367417 | A1 | * | 12/2016 | Ramirez | A61G 5/10 |
| 2018/0250188 | A1 | * | 9/2018 | Gardner | A61H 3/04 |

* cited by examiner

*Primary Examiner* — Joshua T Kennedy
(74) *Attorney, Agent, or Firm* — Eugene F. Derényi; Fogler, Rubinoff LLP (57) ABSTRACT

An connector apparatus and kit for detachably connecting a conventional walker to a conventional wheelchair.

2 Claims, 12 Drawing Sheets

APPARATUS FOR ATTACHING A WALKER TO A WHEELCHAIR

FIELD OF THE INVENTION

The present invention generally relates to the field of walkers and wheelchairs. In particular, the present invention is directed to an apparatus for attaching a conventional walker to a wheelchair.

BACKGROUND OF THE DISCLOSURE

Walkers which are attachable to wheelchairs are known. However, such walkers are either custom made for the wheelchair and/or cannot be used on their own once detached from the wheelchair. The present disclosure provides an apparatus usable with conventional walkers and wheelchairs, and that further allows the walker and wheelchair to be used independently as usual when detached.

SUMMARY OF THE DISCLOSURE

In one implementation, the present disclosure is directed to a connector apparatus for detachably connecting a conventional walker to a wheelchair including first and second side assemblies substantially planar in structure, the two side assemblies each including an upper assembly and a lower assembly, the upper assembly including an upper horizontal section and spaced apart substantially parallel upper vertical sections extending from the upper horizontal section, and a lower horizontal section including spaced apart substantially parallel lower vertical sections, wherein the upper vertical sections are telescopically fitted in the lower vertical sections for vertical adjustment, and attachment hardware affixed to the front and rear of each of the side assemblies for attaching the front ends of the side assemblies to the walker and the rear ends of the side assemblies to the wheelchair such that when the apparatus is attached to both the walker and the wheelchair, the side assemblies are positioned substantially vertical and spaced apart and permit a patient to move between the side assemblies, between the walker and the wheelchair. The connector apparatus can further include upper and lower horizontal bars telescopically fitted in the upper and lower horizontal section for providing horizontal adjustment. The connector apparatus can further include a pair of legs hingedly attached to the side assemblies for movement between a retracted position when not in use and a deployed position for supporting the front sections of the side assemblies when the walker is disconnected from the connector.

In another implementation the present disclosure is directed to a kit for detachably connecting a conventional walker to a wheelchair including first and second side assemblies substantially planar in structure, the two side assemblies each including an upper assembly and a lower assembly, the upper assembly including an upper horizontal section and spaced apart substantially parallel upper vertical sections extending from the upper horizontal section, and a lower horizontal section including spaced apart substantially parallel lower vertical sections, wherein the upper vertical sections are telescopically fitted in the lower vertical sections for assembly and vertical adjustment, and attachment hardware for attaching the front ends of the side assemblies to the walker and the rear ends of the side assemblies to the wheelchair such that when the side assemblies are attached to both the walker and the wheelchair, the side assemblies are positioned substantially vertical and spaced apart and permit a patient to move between the side assemblies, between the walker and the wheelchair. In the kit, the attachment hardware can include first and second mating parts, the first parts affixed to the ends of the side assemblies and the second parts affixable to the walker or the wheelchair. The kit can further include a pair of legs hingedly attached to the side assemblies for movement between a retracted position when not in use and a deployed position for supporting the front sections of the side assemblies when the walker is disconnected from the connector.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

DETAILED DESCRIPTION

Figure 1:
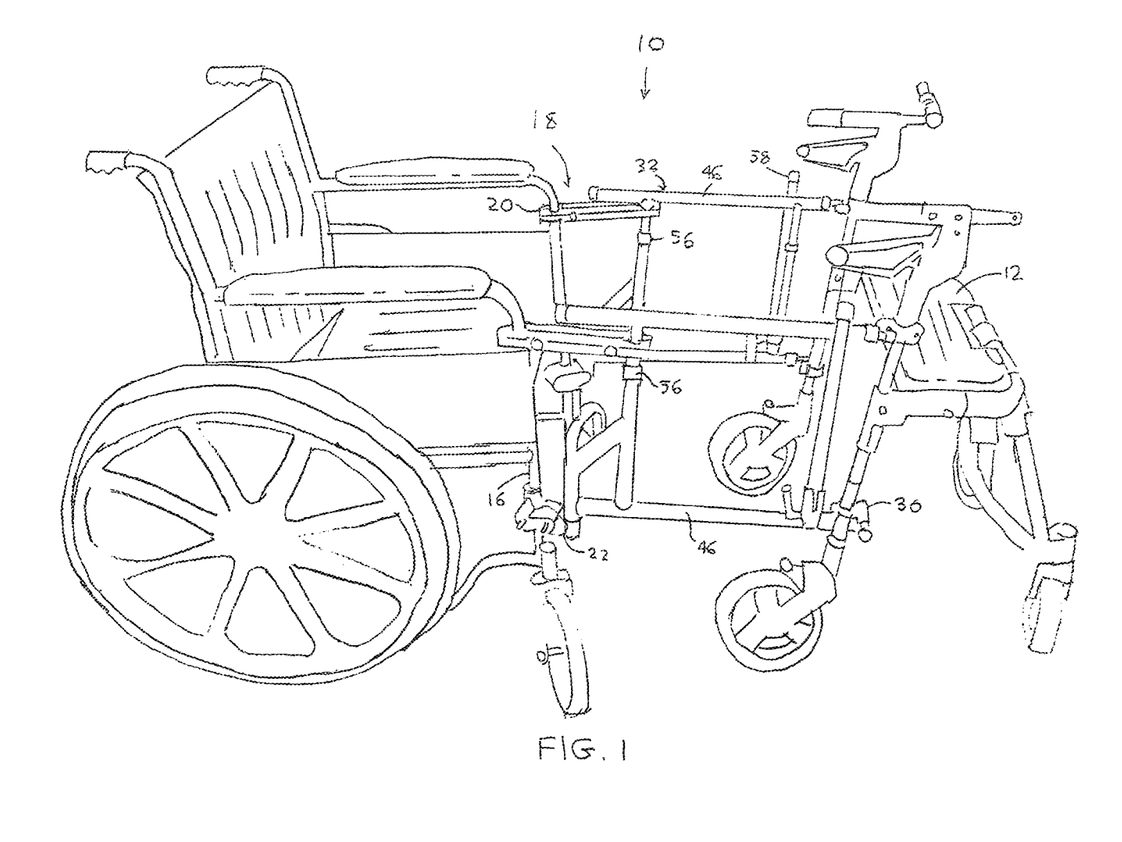
FIG. 1 is a side perspective view of a connector apparatus in accordance with an embodiment of the present invention.

Referring initially to FIG. 1, a connector apparatus indicated generally at 10 connecting a conventional walker 12 to a conventional wheelchair 14 is shown, illustrative of an exemplary embodiment of the present invention. It will be noted that the connector apparatus is preferably fastened at a rear end, indicated generally at 18, to vertical structural members 16 of the wheelchair 14 by means of attachment hardware consisting of e.g. upper double barrel clamps 20 and lower barrel clamps 22, and at a front end, indicated generally at 24, to vertical structural members 26 of the walker 12 by means of upper barrel clamps 28 and lower barrel clamps 30.

It will be noted that walker 12 and wheelchair 14 require no modification to except clamps 20, 22, 28 and 30. In attachment to the wheelchair 14, one barrel of each of the clips 20, 22, and the barrel of each clip 22, is placed around the vertical structural members 16. Similarly, in attachment to the walker 12, the barrel of clips 28, 30 is placed around structural members 26. The clips 20, 22, 28 and 30 are secured by tightening screws to create frictional force to hold the clips 20, 22, 28 and 30 in place. The clips are preferably fabricated from rigid plastic or metal.

The connector apparatus 10 is a two sided framework side assemblies indicated generally at 32 and 34 substantially planar in structure. The side assemblies 32 and 34 are preferably fabricated from tubular light weight metal, such as aluminum or a tubular plastic, such as PVC.

Figure 2:
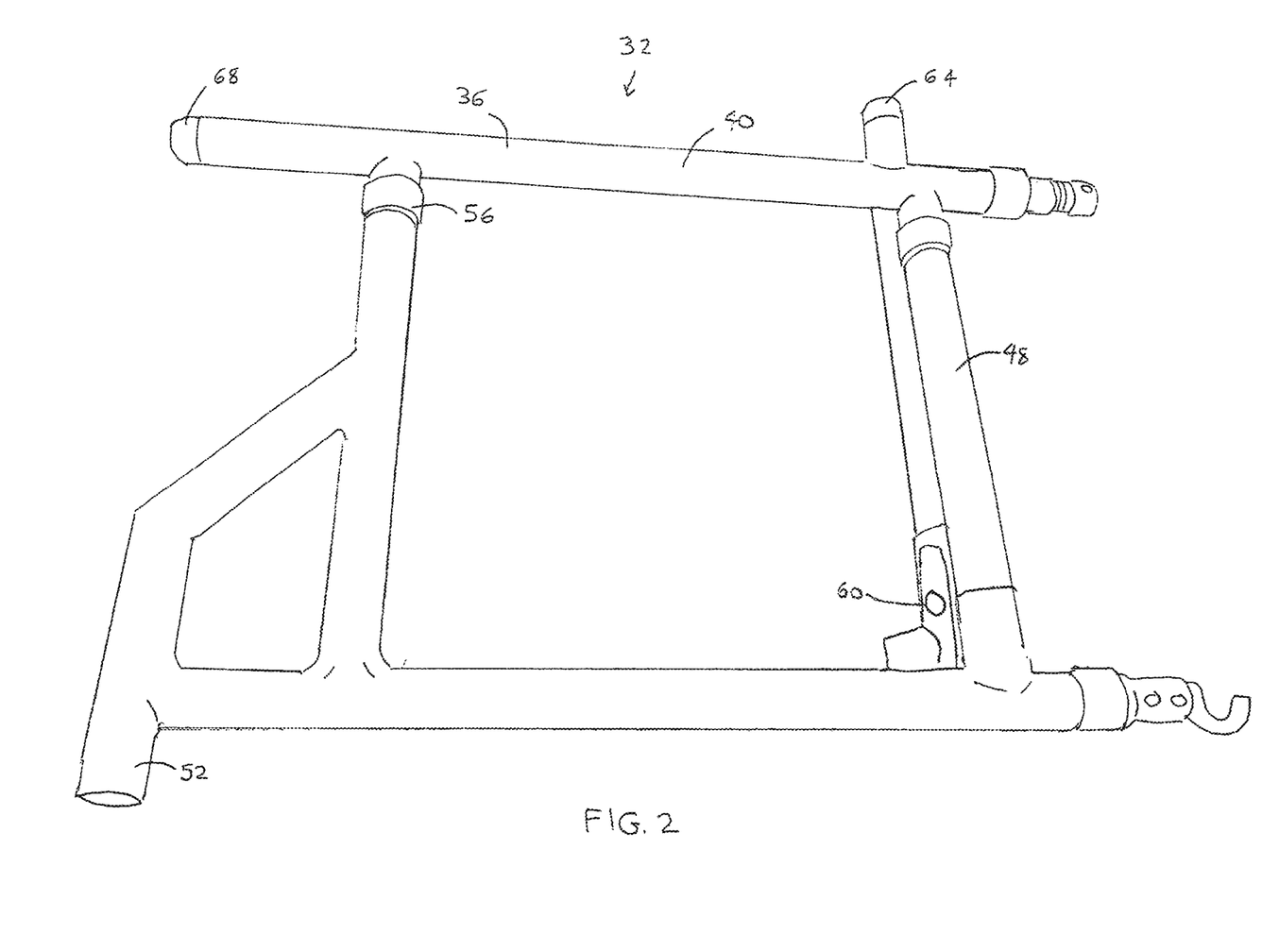
FIG. 2 is a side view of a side assembly of FIG. 1.
Figure 3:
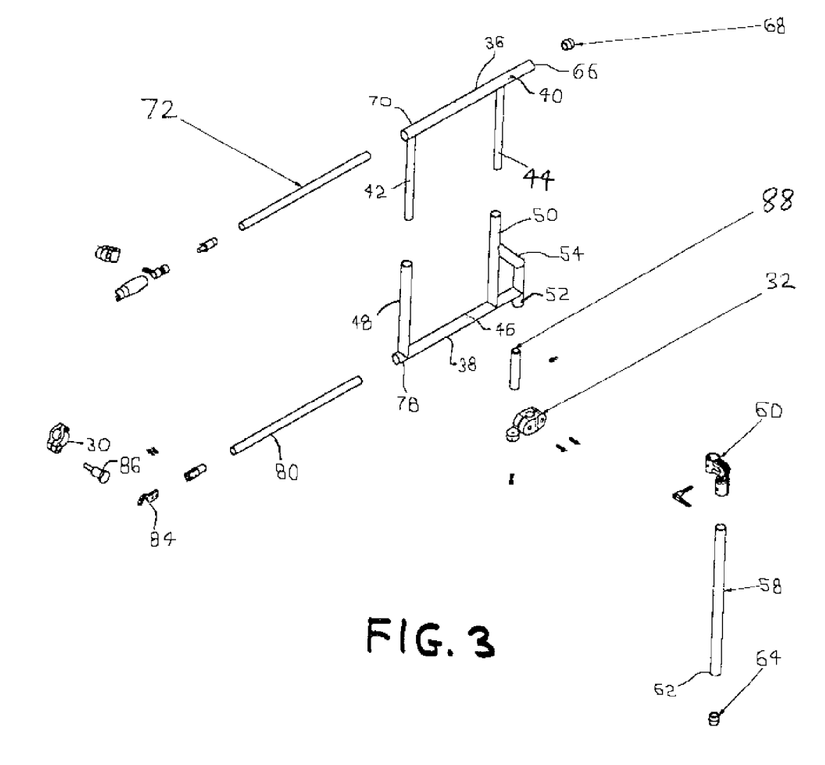
FIG. 3 is an exploded view of the side assembly of FIG. 2.

Referring to FIGS. 2 and 3, side assembly 32 is illustrated. Side assembly 34 is a mirror image of side assembly 32 and the description of side assembly 32 also describes side assembly 34. Side assembly 32 includes an upper assembly 36 and a lower assembly 38. The upper assembly 36 includes upper horizontal section 40, front vertical section 42 and rear vertical section 44. The lower assembly 38 includes lower horizontal section 46, front vertical section 48, rear vertical section 50, rear vertical mounting section 52 and rear brace section 54 connecting the rear vertical mounting section 52 to the vertical section 50.

When the upper assembly 36 and the lower assembly 38 are assembled, the front section 42 and the rear vertical section 44 are telescopically fitted in the companion front vertical section 48 and rear vertical section 50, respectively, for vertical adjustment. Vertical adjustment allows the height of the upper horizontal section 40, which is available as a handhold for the patient, to be adjusted to accommodate the height of the patient for supporting him or herself while standing or walking, for example, The vertical sections 42, 48 and 44, 50 are retained in adjusted position by twist lock 56.

Figure 4:
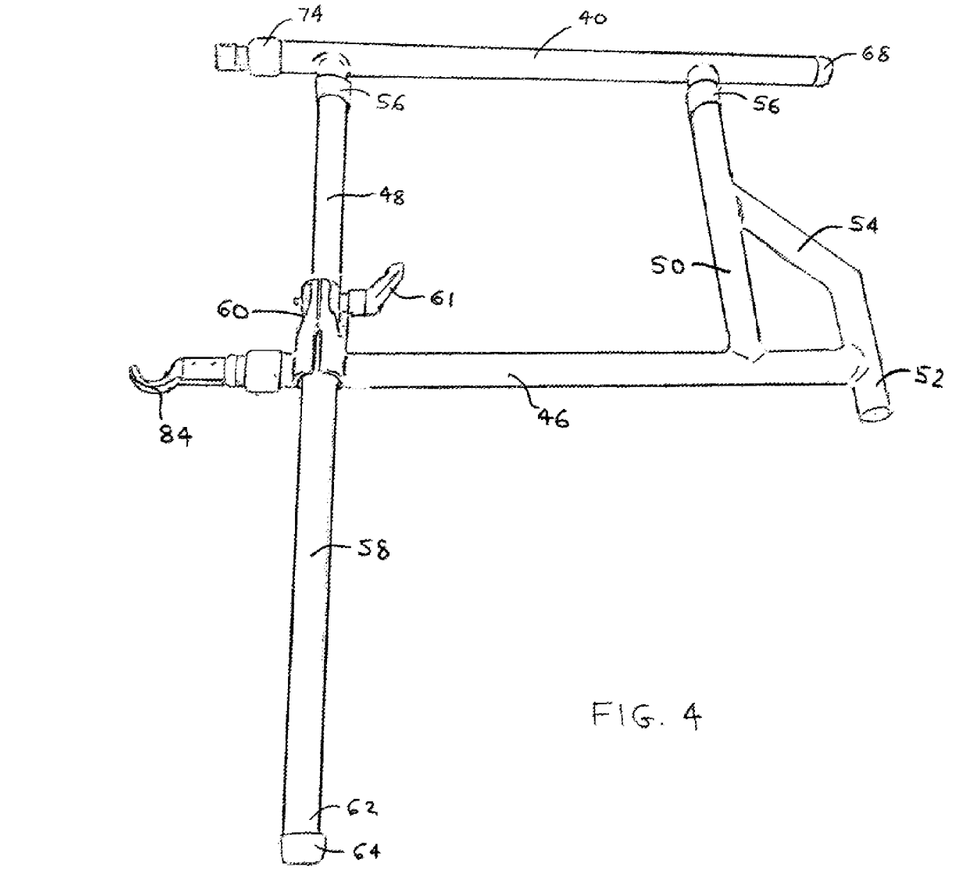
FIG. 4 is a side view of the side assembly of FIG. 2 with the leg deployed.
Figure 5:
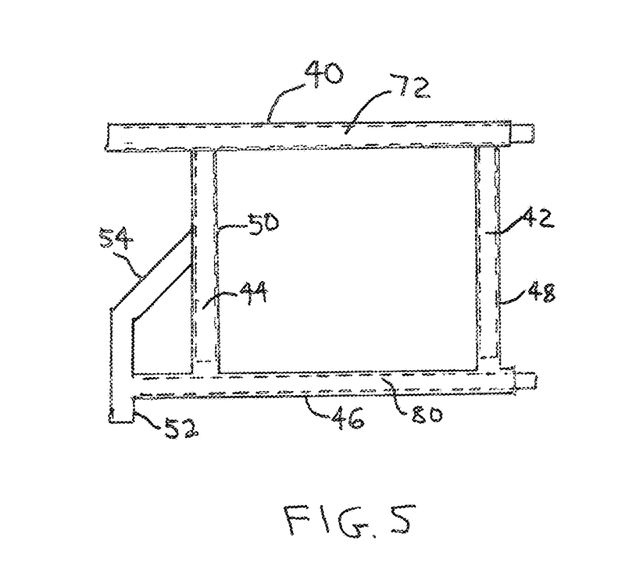
FIG. 5 illustrates a side view of the side assembly of FIG. 2, in a retracted position, paired down with attachment hardware, leg, end-cap and pad removed.
Figure 6:
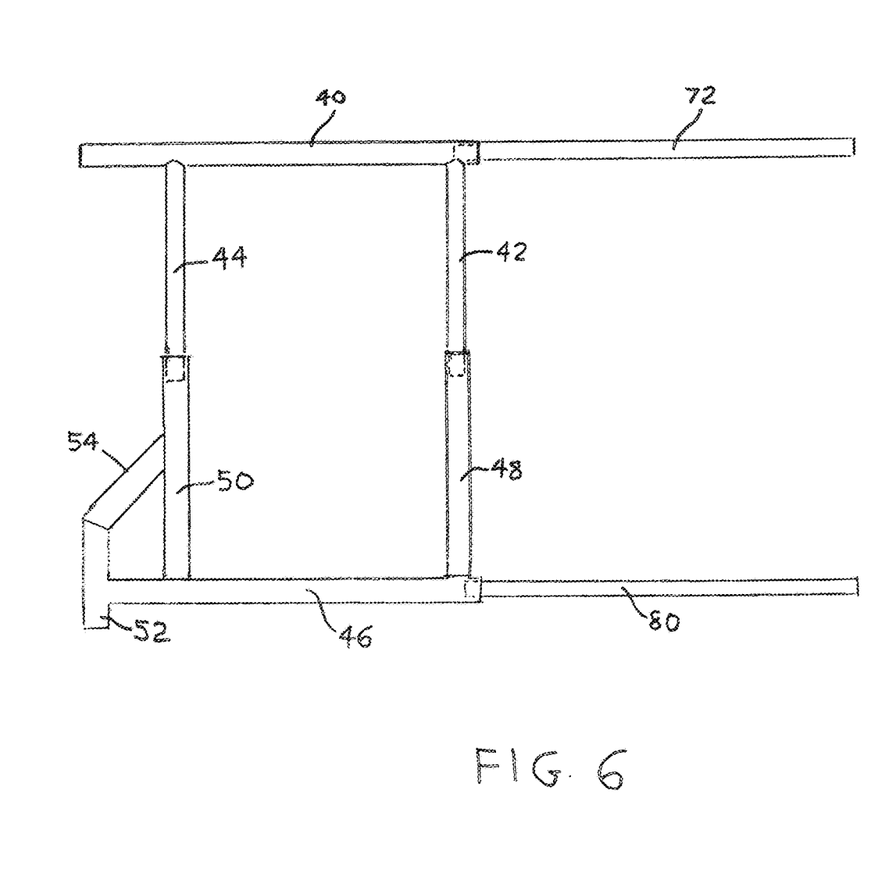
FIG. 6 illustrates a side view of the side assembly of FIG. 5 in an extended position.
Figure 7:
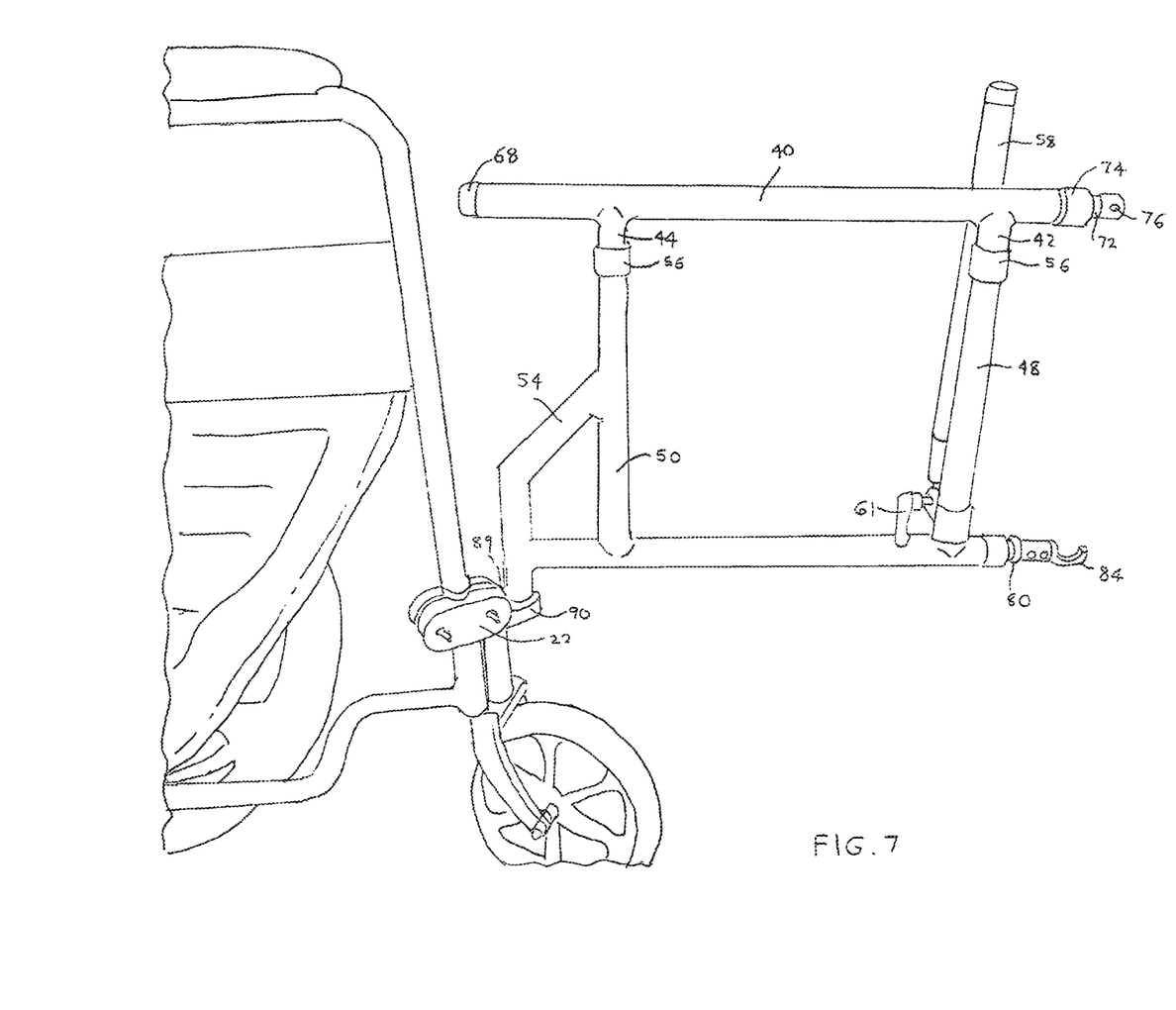
FIG. 7 is a side view of the side assembly of FIG. 2 installed on a wheelchair.
Figure 8:
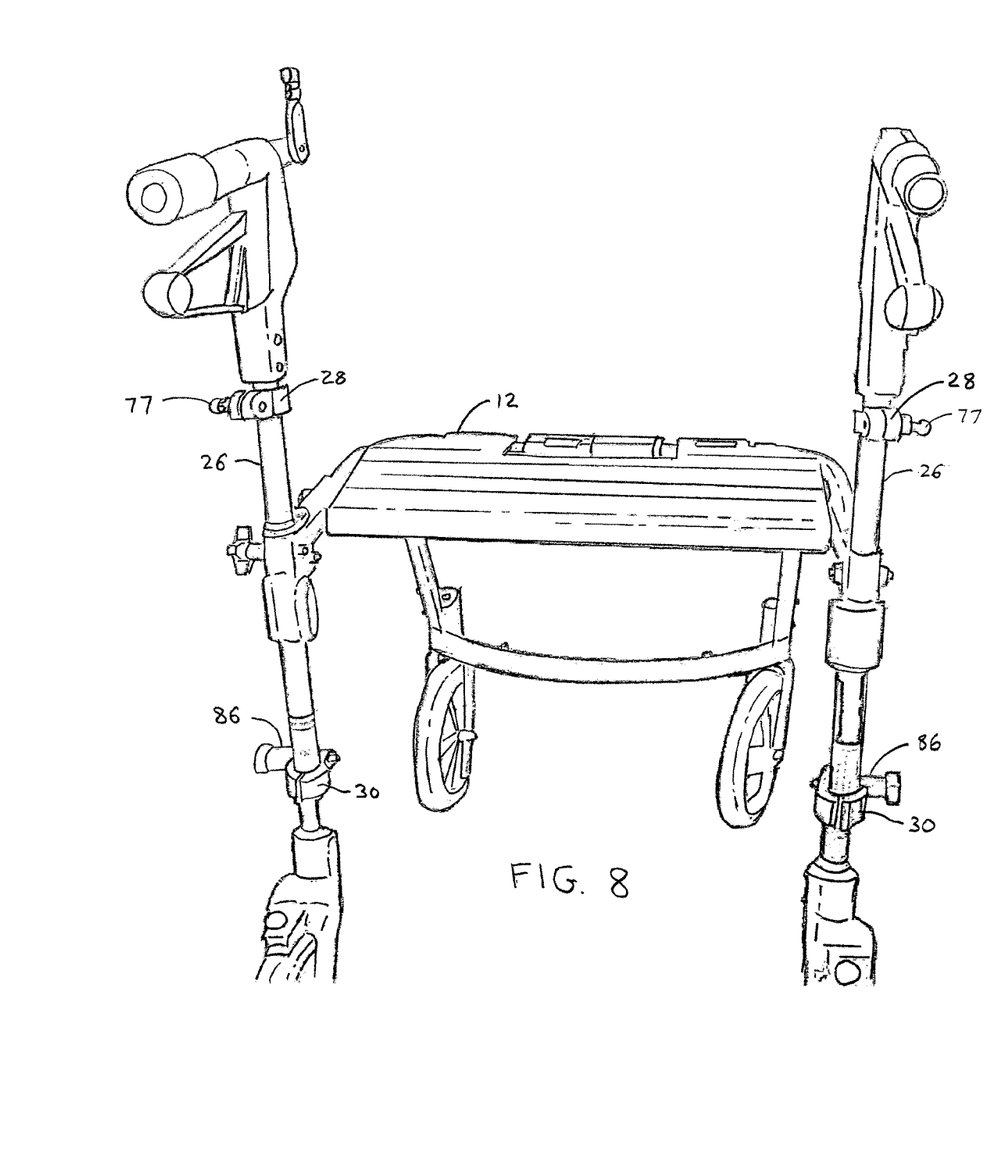
FIG. 8 is a rear view of the walker of FIG. 1 disconnected from the connector apparatus and showing with clamps fitted to the walker.
Figure 9:
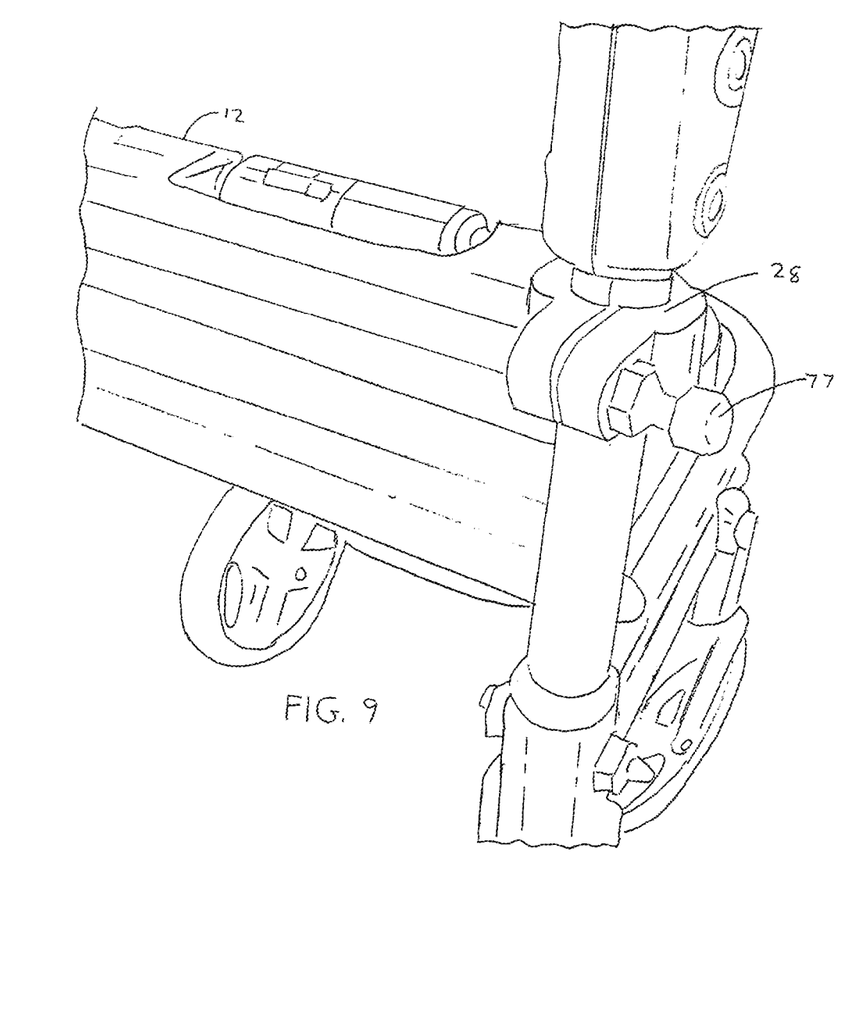
FIG. 9 is an enlarged view of an upper clamp with lock ball on the walker of FIG. 8.
Figure 10:
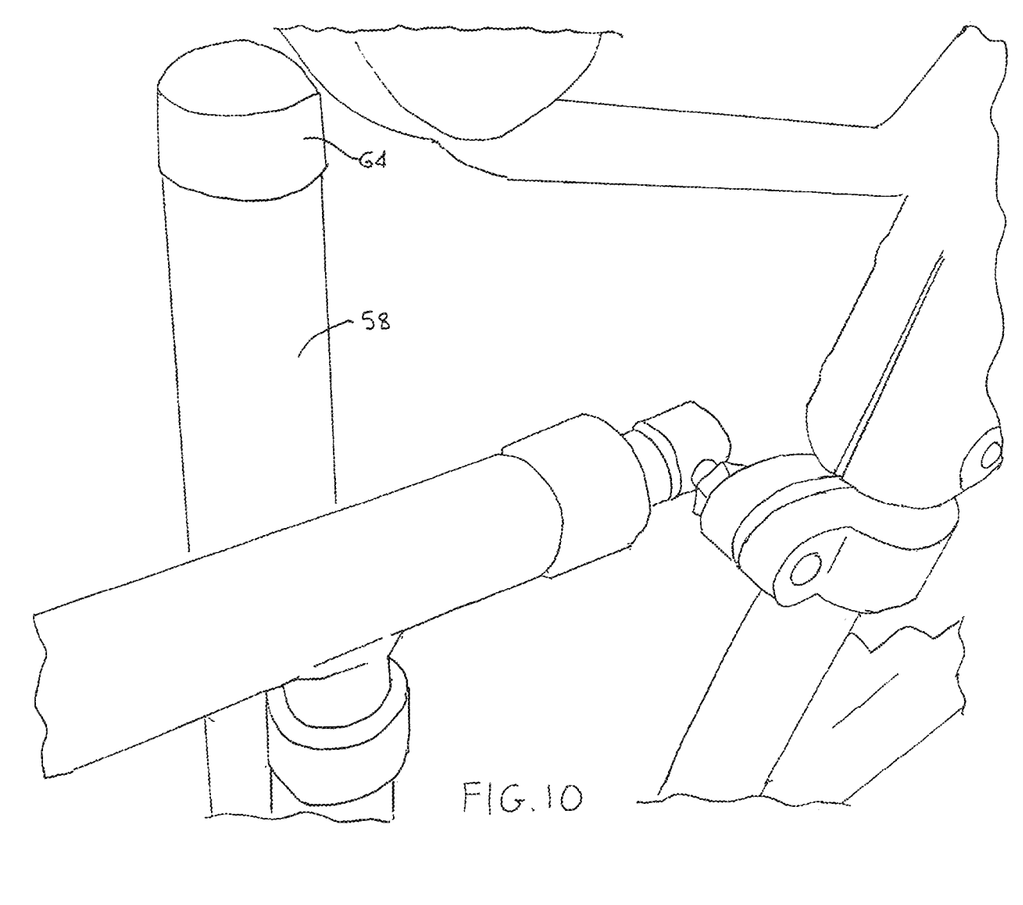
FIG. 10 is a close-up view of an upper horizontal bar connected to a bracket on the walker of FIG. 1.
Figure 11:
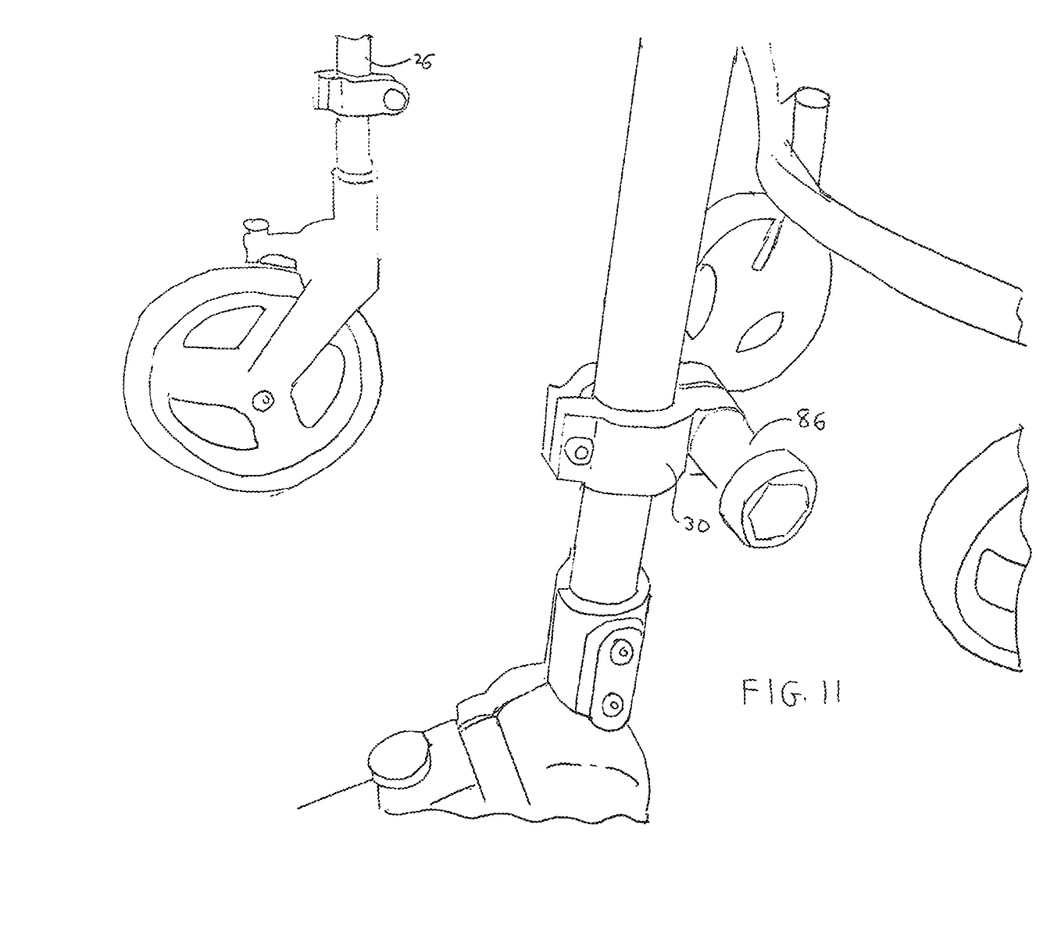
FIG. 11 is a close-up view of a lower bracket and lug on the walker of FIG. 1.
Figure 12:
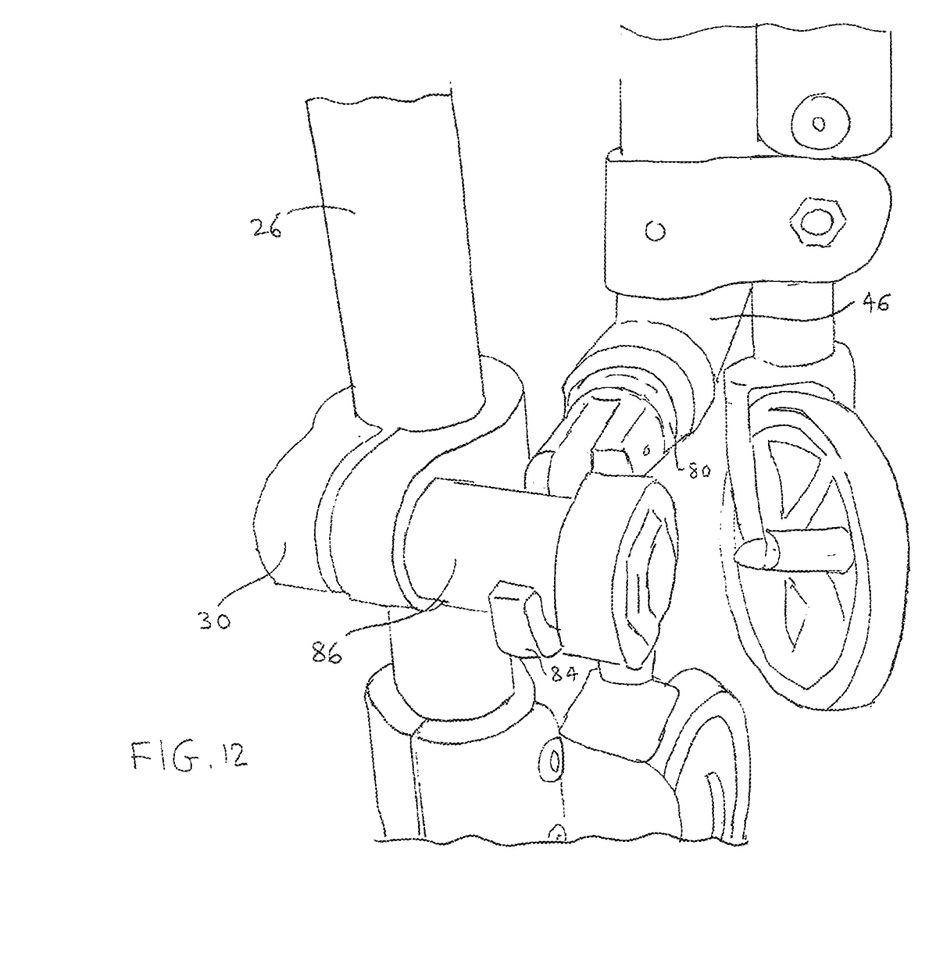
FIG. 12 is a close-up view of a lower horizontal bar with hook connected to a lower bracket on the walker of FIG. 1.
Figure 13:
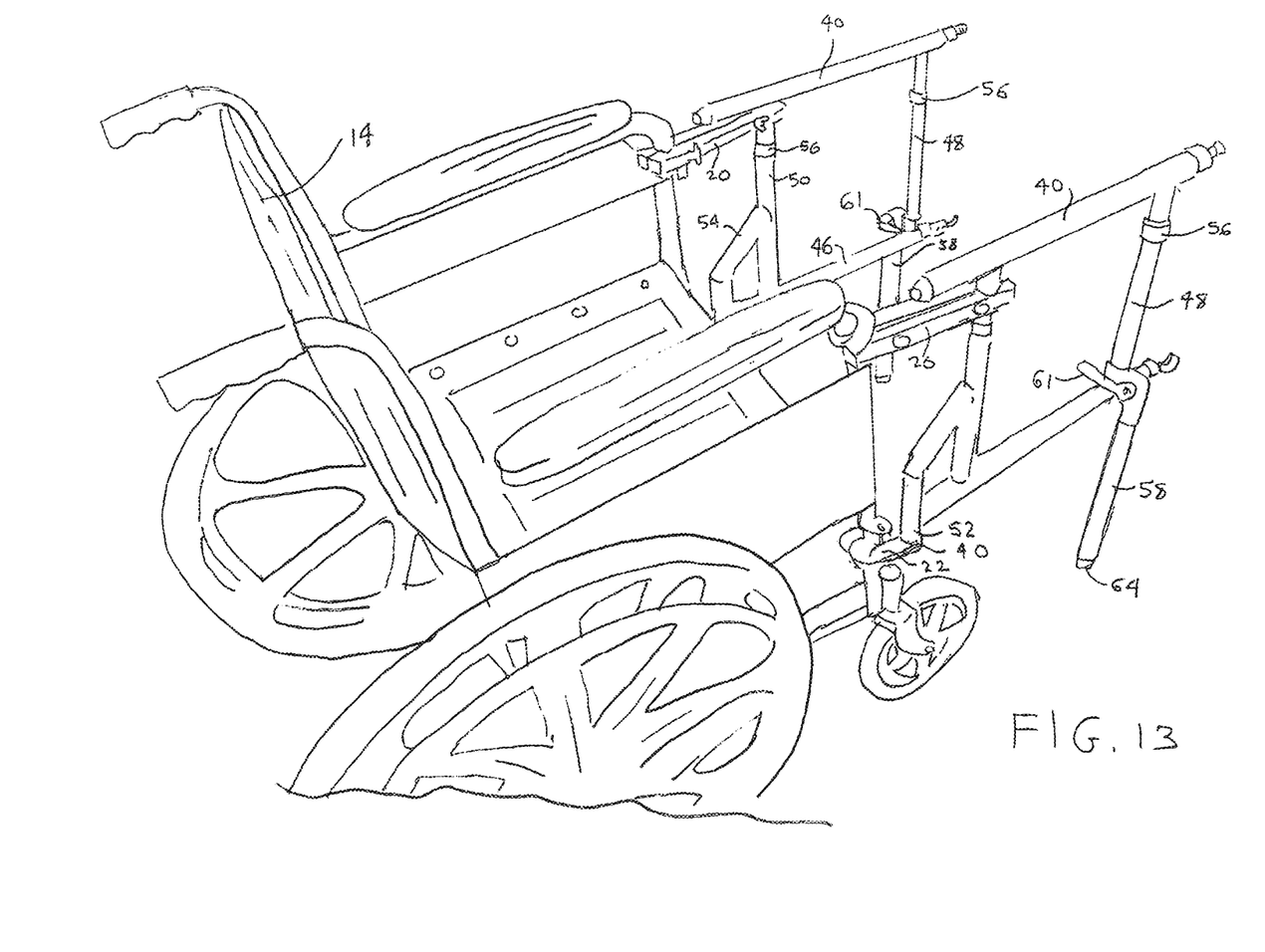
FIG. 13 shows the wheelchair and connector apparatus of FIG. 1 with the walker removed and the legs of the connector apparatus deployed.

The side assembly 32 is provided with leg 58. Referring to FIG. 2, leg 58 is illustrated in a retracted position generally parallel to front vertical section 48. Leg 58 is secured to vertical section 48 by hinge 60 with a lever lock 61. Referring to FIG. 4, leg 58 is illustrated in a deployed position. The free end 62 of leg 58 is fitted with pad 64.

The rear end 66 of each upper horizontal section 40 is fitted with a end-cap 68 for blunting any sharp edges of the end 66. The front end 70 of the upper horizontal section 40 extends beyond the front vertical section 42. An upper horizontal adjustment bar 72 is telescopically fitted in the upper horizontal section 40 for horizontal adjustment, and is retained in adjusted position by twist lock 74.

A quick release ball joint socket 76 is provided on the free end of the bar 72 for receiving ball lock knob 77 on the lug 79 for clamp 28 on the corresponding side of the walker 12. The ball joint socket 76 and ball lock knob 77 allow for misalignment caused by variations in walker and wheelchair designs.

The front end 78 of the lower horizontal section 46 extends beyond the front vertical section 48. A lower horizontal adjustment bar 80 is telescopically fitted in the lower horizontal section 46 for horizontal adjustment, and is retained in adjusted position by twist lock 82. A hook 84 is provided on the front end 78 of the lower horizontal adjustment bar 46 for attaching the lower horizontal adjustment bar 80 to stud 86 on the clamp 30 on the corresponding side of walker 12. The hook 84 allows the lower horizontal adjustment bar 80 to be easily and quickly disconnected from the stud 86 while providing support and alignment for the side assembly 34 when connected.

Horizontal adjustment of the upper and lower horizontal adjustment bars 72, 80 allows the length of the side assemblies 32, 34 to be adjusted to accommodate the angle of vertical supports of the walker 12 and to vary the separation between the walker 12 and the wheelchair 14.

The rear vertical mounting section 52 is hollow for receiving vertical hinge peg 88 which is attached to a tab 90 on clamp 22 on wheelchair 14. The rear vertical mounting section 52 can pivot around the longitudinal axis of peg 88 and can be locked with locking pin 89 to prevent pivoting.

Walker 12 can be disconnected from the connector apparatus 10 by removing the ball lock knobs 77 from the corresponding ball joint sockets 76 and unhooking hooks 84 from studs 86. In another embodiment, side assemblies 32, 34 can remain connected to wheelchair 14 and the legs 58 deployed to support the front ends of the side assemblies 32, 34. In this configuration, the side assemblies 32, 34 can aid a patient in standing up from the wheelchair 14 and walking forward from it.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A connector apparatus for detachably connecting a walker to a wheelchair comprising:

first and second side assemblies substantially planar in structure, the two side assemblies each including an upper assembly and a lower assembly, the upper assembly including an upper horizontal section and spaced apart substantially parallel upper vertical sections extending from the upper horizontal section, and a lower horizontal section including spaced apart substantially parallel lower vertical sections, wherein the upper vertical sections are telescopically fitted in the lower vertical sections for vertical adjustment;

upper and lower horizontal bars telescopically fitted in the upper and lower horizontal section for providing horizontal adjustment; attachment hardware affixed to a front end and a rear end of each of the side assemblies and configured to attach the front ends of the side assemblies to a walker and the rear ends of the side assemblies to a wheelchair such that when the apparatus is attached to both a walker and a wheelchair, the side assemblies are positioned substantially vertical and spaced apart and permit a patient to move along the side assemblies, between a walker and a wheelchair; and a pair of legs hingedly attached to the side assemblies for movement between a retracted position when not in use and a deployed position for supporting the front ends of the side assemblies on a surface below the front ends when the front ends are in a disconnected configuration from a walker.

2. A kit for detachably connecting a walker to a wheelchair comprising:

first and second side assemblies substantially planar in structure, the two side assemblies each including an upper assembly and a lower assembly, the upper assembly including an upper horizontal section and spaced apart substantially parallel upper vertical sections extending from the upper horizontal section, and a lower horizontal section including spaced apart substantially parallel lower vertical sections, wherein the upper vertical sections are telescopically fitted in the lower vertical sections for assembly and vertical adjustment, upper and lower horizontal bars telescopically fitted in the upper and lower horizontal section for providing horizontal adjustment; attachment hardware affixed to a front end and a rear end of each of the side assemblies and configured to attach the front ends of the side assemblies to a walker and the rear ends of the side assemblies to a wheelchair such that when the side assemblies are attached to both a walker and a wheelchair, the side assemblies are positioned substantially vertical and spaced apart and permit a patient to move along the side assemblies, between a walker and a wheelchair; and a pair of legs hingedly attached to the side assemblies for movement between a retracted position when not in use and a deployed position for supporting the front ends of the side assemblies on a surface below the front ends when the front ends are in a disconnected configuration from a walker.

\* \* \* \* \*